United States Patent [19]

Ackley, Sr. et al.

[11] 4,327,825
[45] * May 4, 1982

[54] CAPSULE POSITIONING GUIDE AND ASSOCIATED VACUUM MANIFOLD FOR CAPSULE ORIENTING MECHANISMS

[75] Inventors: Charles E. Ackley, Sr., Oreland, both of Pa.; Charles E. Ackley, Jr., Philadelphia, Pa.

[73] Assignee: R. W. Hartnett Company, Philadelphia

[*] Notice: The portion of the term of this patent subsequent to Aug. 8, 1995, has been disclaimed.

[21] Appl. No.: 120,679

[22] Filed: Feb. 11, 1980

Related U.S. Application Data

[63] Continuation of Ser. No. 905,742, May 15, 1978, Pat. No. 4,231,462.

[51] Int. Cl.³ ............................................. B65G 47/14
[52] U.S. Cl. ..................................... 198/380; 198/384; 198/393; 198/397
[58] Field of Search ............... 198/380, 384, 393, 397, 198/400; 221/156, 157, 173; 271/308

[56] References Cited

U.S. PATENT DOCUMENTS

| | | | |
|---|---|---|---|
| 3,871,295 | 3/1975 | Ackley | 198/380 X |
| 4,104,966 | 8/1978 | Ackley et al. | 198/380 X |
| 4,231,462 | 11/1980 | Ackley et al. | 198/380 |

Primary Examiner—Jeffrey V. Nase
Attorney, Agent, or Firm—Austin R. Miller

[57] ABSTRACT

In a turning and orienting apparatus of the type adapted to transport capsules in a plurality of pockets or the like, which pockets are formed in a continuously moveable transport conveyor, and wherein said apparatus is further adapted to rectify the capsules, which have body portions and cap portions of greater transverse dimensions than the body portions, and wherein a vacuum is provided to shift the capsules into the desired rectified position, a capsule positioning guide is provided to retain each capsule in its pocket immediately prior to its being subjected to the vacuum. The capsule positioning guide then releases the capsule as it is subjected to the vacuum. In a preferred embodiment of the invention, the capsule positioning guide is pivotally mounted adjacent the capsule transport conveyor so that it can be easily moved out of its operative condition adjacent the transport conveyor for easy cleaning thereof.

6 Claims, 5 Drawing Figures

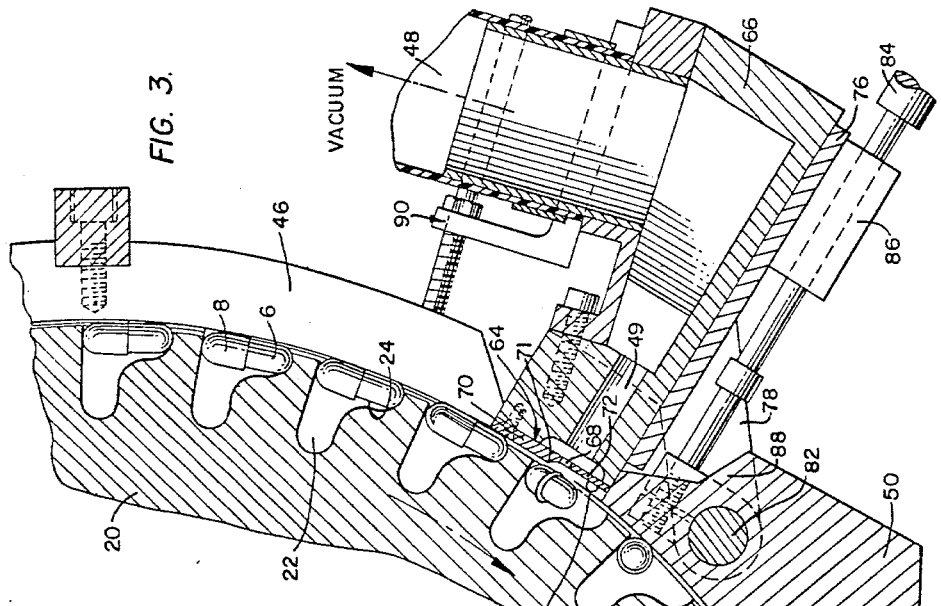
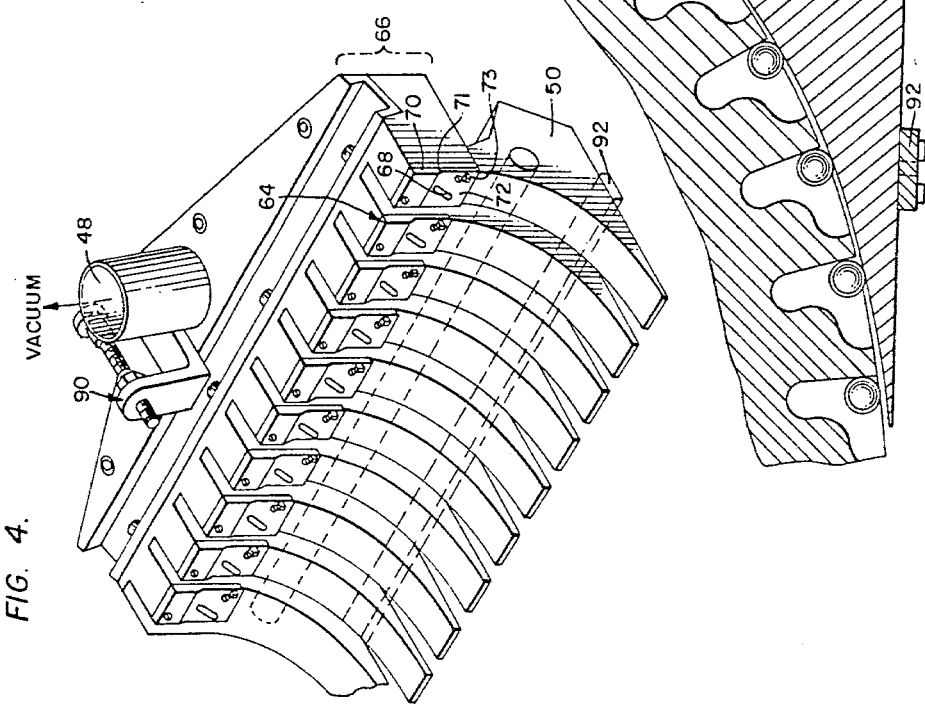

CAPSULE POSITIONING GUIDE AND ASSOCIATED VACUUM MANIFOLD FOR CAPSULE ORIENTING MECHANISMS

This is a continuation of application Ser. No. 905,742, filed 5/15/78, now U.S. Pat. No. 4,231,462, issued Nov. 4, 1980.

BACKGROUND OF THE INVENTION

This application pertains to devices which are adapted to transport and rectify capsules having body portions and cap portions of greater transverse dimensions than the body portions. Rectification, as is known in the art, is a process in which all cap portions of each capsule are aligned in a certain predetermined position and in which all body portions of the capsules are aligned in another predetermined position. According to the invention, an apparatus is provided to rectify the capsules by shifting the capsules into the desired dispositions by use of a vacuum means as the capsules are carried in pockets or the like formed in a continuously rotatable transport cylinder. Immediately prior to being subjected to the vacuum means, the capsules are retained in their respective pockets by means of the capsule positioning guide means in accordance with the present invention. The capsule positioning guide means then releases the capsules as they are subjected to the vacuum so that rectification thereof can be effected.

U.S. Pat. No. 2,859,689 (Ackley) discloses a device in which a multiplicity of pellets or similar articles are transported by means of a rotatable cylinder and an endless conveyor and then are presented to a printing means whereby the desired indicia, such as trademarks, lot numbers, etcetera, are imprinted upon the pellets. The rotatable cylinder is provided with a plurality of pockets into which the pellets are received from a hopper member. After approximate 180° rotation on the transport cylinder, the pellets are transferred to the endless conveyor which presents the pellets to the printing station.

In U.S. Pat. No. 3,871,295 (Ackley), a capsule rectification apparatus is disclosed wherein the capsules are transferred from a hopper to a rotatable cylinder having capsule receiving pocket portions. The capsules are randomly received in pocket portions that are radially disposed with respect to the transport cylinder. The capsules may be disposed in either the "caps up" or "caps down" position. An air jet shifts the body portions of the "caps down" capsules into pocket portions which are oriented in the direction of movement of the rotatable cylinder so that the cap portions can subsequently be shifted in a sidewise direction by a subsequent sideward directed air jet. Those capsules which are in "caps up" position in the radial pocket portions are not affected by the first air jet because of a barrier which prevents their movement; the cap portions of these "caps up" capsules are subsequently blown sideways by a sidewardly directed air stream. In this way, the positions of the capsules are rectified, with all of the cap portions on one side of a predetermined path and all of the body portions on the other side of the predetermined path.

In our co-pending application Ser. No. 672,017 filed Mar. 30, 1976, allowed Feb. 27, 1978 now U.S. Pat. No. 4,104,966, a capsule rectification apparatus is disclosed wherein a vacuum means is provided to effect sidewise shifting of the capsules as they are carried in their respective pockets located in the rotatable conveyor. The disclosed device provides significant improvements in overall speed and rectification efficiency. However, it is not without some problems. For instance, sometimes, a capsule can stick in its pocket on the rotatable cylinder during the vacuum shifting operation and thus is not properly rectified. Further, dust sometimes collects in the mechanism, along the interface of the rotatable conveyor and the vacuum source. Dust accumulation adversely affects both speed and rectification efficiency of the apparatus. This dust is also difficult to eliminate, as it requires disassembly of certain parts of the apparatus prior to cleaning thereof.

Accordingly, it is an object of the present invention to provide a capsule rectification apparatus of improved efficiency.

It is a further object to provide such a device wherein certain machine components, located along the conveyor-vacuum interface, may be pivoted into and out of position so that accumulated dust and the like can be readily removed therefrom.

These and other objects will become more apparent hereinafter in the detailed description and appended drawings.

DESCRIPTION OF THE DRAWINGS

In the drawings,

FIG. 3 is an enlarged vertical transverse sectional view of the apparatus shown in FIG. 1, particularly highlighting the structural relationship between the vacuum source and capsule positioning guide means in accordance with the invention;

FIG. 4 is a perspective view of the capsule positioning guide means and associated vacuum manifold which appear in FIGS. 1 and 3.

DETAILED DESCRIPTION

Figure 1:
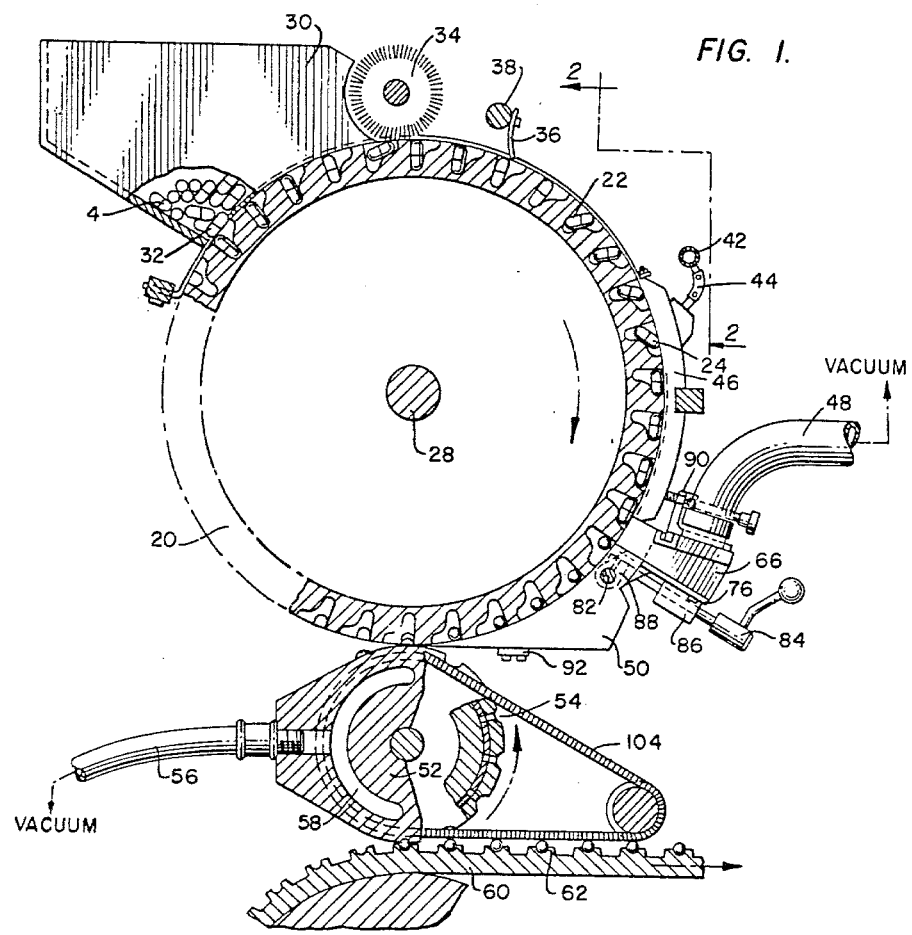
FIG. 1 is a vertical transverse sectional view taken through a machine embodying features of this invention.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

The present invention provides significant improvements over the basic vacuum rectification mechanism disclosed in our aforementioned U.S. Pat. No. 4,104,466. The entire disclosure of this patent is hereby incorporated by reference.

Figure 2:
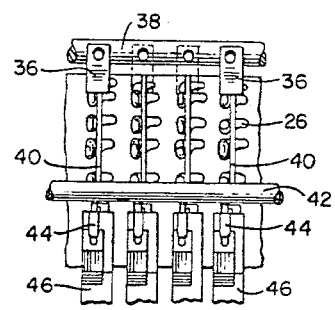
FIG. 2 is a fragmentary sectional view of a portion of the transport cylinder appearing in FIG. 1, taken along the lines and arrows 2—2, of FIG. 1.

Turning now to FIG. 1 of the drawings, there is shown a continuously rotatable transport cylinder 20 provided with radially oriented pocket portions 22, pockets extending in the rotational direction of the cylinder (hereinafter transport oriented pockets 24), and axial oriented pockets 26 (FIG. 2). The transport cylinder 20 is rotatably mounted on cylinder roll shaft 28, which shaft 28 is journaled in two side frame members as shown in U.S. Pat. No. 2,859,689.

A hopper 30 is positioned above the transport cylinder 20 and has an opening 32 in the bottom portion thereof, through which, capsules 4 fall and are received in the pockets of the cylinder 20. A rotatable brush 34 (FIGS. 1 and 2) is positioned immediately to the right of the hopper 30 as shown in FIG. 1. The brush bristles gently impinge upon the surface of the cylinder 20 and brush improperly aligned capsules into the radial pockets 22.

As is clearly shown in FIG. 2, tabs 36 positioned on shaft 38, extend across the width of the cylinder 20 and bear against the capsules 4 so that the capsules are properly seated in the radial pockets 22. Alignment wires 40 extend in the transport direction of the cylinder 20 to prevent the capsules 4 from falling into the axial pocket portions 26.

Downstream from the alignment wires 40, a fluid manifold 42 and connecting fluid jet conduits 44 are positioned to supply a transport direction oriented stream of fluid upon the capsules. Gauging blocks 46 are positioned adjacent the cylinder surface to prevent forward tilting of "caps up" capsules into the transport oriented pockets 24 and to allow tilting of the body portions of the "caps down" capsules into the transport oriented pocket portions 24. The gauging blocks 46 also act as a means of inhibiting stray and eddy currents, which may develop from the fluid manifold 42 and fluid jet conduits 44, from affecting the neighboring rows of pockets as described in our U.S. Pat. No. 4,104,966.

Downstream from the gauging block assembly 46, vacuum source 48 is positioned. This vacuum draws upon the capsules 4 as they exit from the gauging block assembly to shift the capsules in a sidewise direction into the axial pockets 26 in rectified position as described in our forementioned U.S. Pat. No. 4,104,966.

Downstream from the vacuum 48, capsule retaining means 50 are provided to hold the capsules in the cylinder pockets as they move toward the downside of the rotatable cylinder, prior to transfer to transfer cylinder 52 and the pocket members 54 associated therewith. Vacuum source 56 and communicating vacuum shoe 58 facilitate transfer of the capsules 4 from the cylinder 20 to the pocket members 54 as the vacuum source 56 draws upon the capsules 4 after they pass the capsule retaining means 50 which is positioned adjacent the cylinder 20.

An endless conveyor 60 and associated capsule carrier 62 are disposed below the cylinder 52. Capsules are transferred to the capsule carriers 62 after an approximate 180° journey about the transfer cylinder 52. Rotatable chain 104 facilitates this transfer as it acts as a means to pry capsules out of the pockets 54 and place the capsules into carriers 62 as disclosed in the aforementioned U.S. Pat. No. 4,104,966. The capsules 4 are then transported to the right as shown in FIG. 1 to be presented to other work stations which may include "wrap around" and/or "on end" printing stations.

Turning our attention now to FIG. 3, it can be seen that the capsules 4 comprise body portions 6 and cap portions 8 of greater transverse dimension than the body portions. In this FIGURE, a capsule is shown with the body portion 6 extending in the transport oriented pocket portion 24. As is described in U.S. Pat. No. 4,104,966, the capsules exit the gauging block assembly in either one of two positions; they can exit as shown in FIG. 3, or they can be disposed in "caps up" disposition in the radial pocket 22. Regardless of which of the above positions the capsules are in as they move out of the gauging assembly 46, the cap portions of all of the capsules are drawn upon by the vacuum 48 so as to rectify the capsules in the axial pockets with all of the caps 8 extending in one predetermined direction and with all of the bodies 6 extending in the opposite direction.

Immediately downstream from the gauging assembly 46 and interposed between cylinder 20 and vacuum source 48 and associated conduit 49 is capsule positioning guide means 64. As shown in FIG. 3, the capsule positioning guide means 64 is threaded to vacuum manifold 66. A slot 68 in the capsule positioning guide means 64 is in communication with vacuum conduit 49 so that the capsule is affected by the vacuum drawn through the slot.

The capsule positioning guide means 64 comprises a plate having a first portion 70 having a thickness sufficient to bear upon the capsule as it exits the gauging assembly 46. This portion 70 retains the capsule in its pocket portion immediately prior to its being subjected to the vacuum. A ridge 71 is provided in the capsule positioning guide means 64 so as to gently bump the capsule prior to its being subjected to the vacuum. Downstream from the portion 70 and ridge 71, and aligned with the vacuum conduit 49, the capsule positioning guide means is provided with a second portion 72 which is thinner in dimension than portion 70. The relative thinness of this portion 72 allows the capsule to be easily drawn upon by the vacuum. Protuberance 73 is provided on the second portion 72 so as to bump any capsules that have not been rectified to jar the non-rectified capsules back into the area of slot 68 so as to be affected by vacuum 48.

Figure 5:
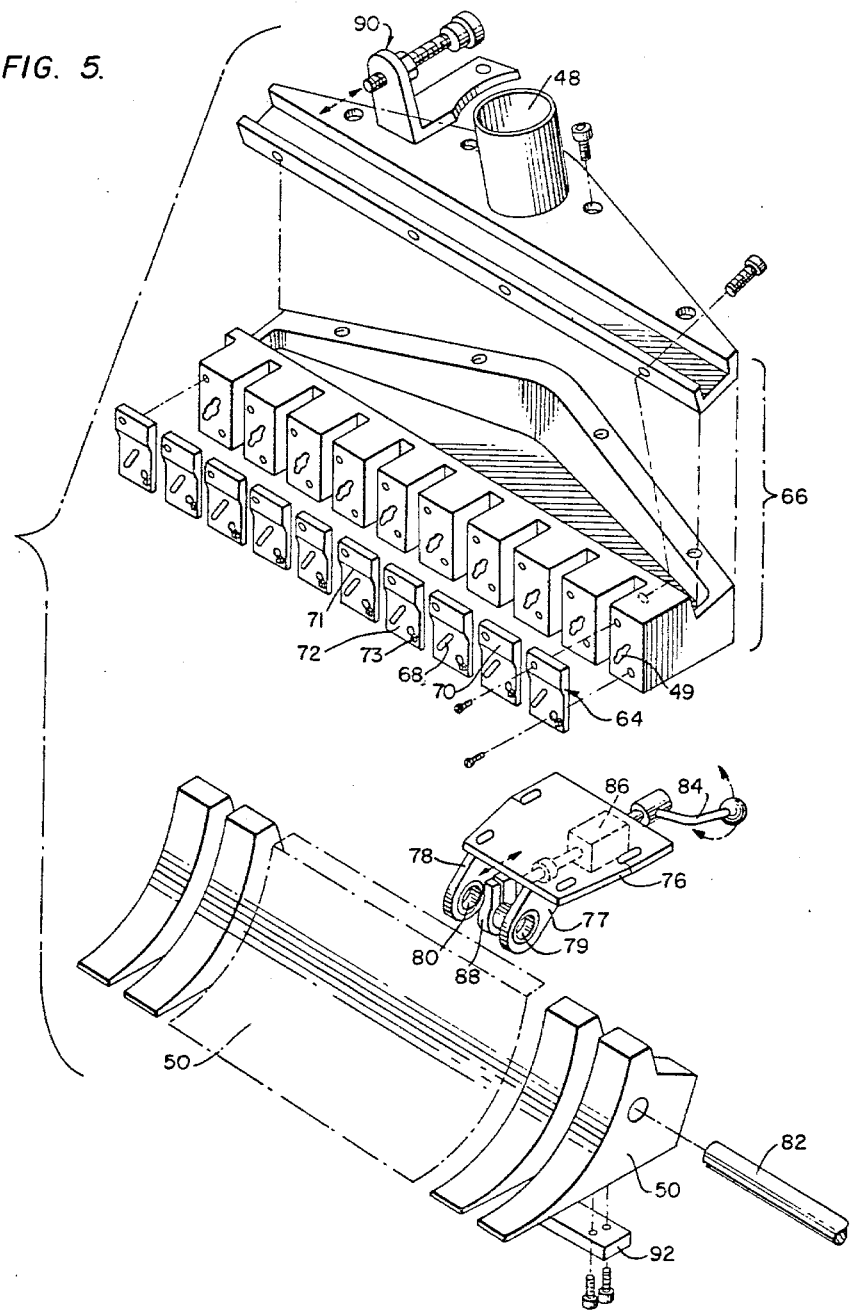
FIG. 5 is an exploded perspective view of the capsule positioning guide means and associated vacuum manifold also showing the means for pivotally mounting same to the mechanism.

As best shown in FIGS. 3 and 5, a support assembly 76 is attached to the underside of the vacuum manifold 66. The support assembly comprises two support legs 77, 78 with bores 79, 80 therein. The legs 77, 78 are mounted on shaft 82 which spins across the side frames, which side frames are shown in U.S. Pat. No. 2,859,689.

A lever 84 is received in boss 86 which is integral with the support assembly 76, and the threaded end of the lever is received in the ring clamp 88 which is also mounted on the shaft 82. Accordingly, it will be appreciated that the capsule positioning guide means 64 and associated vacuum manifold 66 can be pivoted into and out of its position adjacent the cylinder 20 by manipulation of the lever 84 so that the capsule positioning guide means-vacuum manifold assembly may be easily cleaned.

An adjustable stop member 90 is carried by the vacuum manifold 66 and bears against the gauging assembly 46 when the capsule positioning guide means-vacuum manifold assembly is in its operative position. This stop member 90 allows accurate adjustment of the spacing between the surface of the cylinder 20 and the capsule positioning guide means 64. Also mounted on the shaft 82 are the arcuate capsule retention means 50. The retention means are also threaded to transverse bar 92.

With reference to FIGS. 4 and 5, it can be seen that when a plurality of adjacent rows of pockets on the cylinder 20 are provided, a corresponding number of capsule positioning guide means 64 are mounted on the vacuum manifold 66. One capsule positioning guide means 64 is provided for each row of pockets on the cylinder 20.

It will be appreciated that other modifications may be made in the form of the "Capsule Positioning Guide Means And Associated Vacuum Manifold For Capsule Orienting Mechanisms" herein disclosed, including reversible parts and substitutions of equivalent members, and the use of certain features of the invention may be used independently of others, all within the spirit and scope of the invention as defined in the appended claims.

We claim:

1. In capsule orienting and turning apparatus, for orienting capsules having body portions and cap portions of greater transverse dimension than said body portions, including hopper means into which a multiplicity of said capsules are to be loaded, a continuously moveable capsule transporting conveyor having a plurality of pockets having generally upright pocket portions for receiving the capsules therein, said pockets being substantially equally spaced apart, each said pocket also having a capsule receiving substantially longitudinal pocket portion arranged to carry the capsule arranged substantially crosswise of the direction of its movement, means for moving said conveyor along a predetermined path with some of the capsules in a caps up attitude and others with a caps down attitude, tilting means for tilting the caps down capsules into an attitude arranged generally along said predetermined path, means for substantially restraining said caps up capsules from such tilting movement while permitting said tilting means to tilt said caps down capsules, the improvement comprising:

(a) vacuum rectification means directed to draw vacuum transversely of said predetermined path and transversely of said tilted caps down capsules, as said caps down and caps up capsules are moved along said predetermined path and pass said vacuum rectification means, to rectify said capsules by shifting the cap portions of those capsules which are in a caps up position, and also the cap portions of those capsules which have been tilted by said tilting means, all into a direction so that the capsule axes are generally crosswise with respect to said predetermined path, and (b) capsule positioning guide means for retaining each said capsule, whether cap up or cap down, in its respective pocket portion immediately prior to its being subjected to said vacuum rectification means and then releasing said capsule when it is subjected to said vacuum rectification means, said capsule positioning guide means being mounted on said vacuum rectification means adjacent said transport conveyor and extending between said vacuum rectification means and said restraining means along the surface of said conveyor in which said pockets are formed, a portion of said positioning guide means more remote said vacuum rectification means and intermediate said hopper and said vacuum rectification means being sufficiently close to the surface of said conveyor to contact both cap up and cap down capsules traveling in said conveyor pocket thereby to maintain said capsules, whether cap up or cap down, in respective portions of said pockets in which said capsules reside while traveling thereby performing said retaining, the portion of said positioning guide means proximate said vacuum rectification means and intermediate said hopper and said vacuum rectification means being removed from the surface of said conveyor relative to said remote portion of said positioning guide means therby to permit release of said capsules from said respective pocket portions when said capsules are subjected to said vacuum wherein said vacuum rectification means draws said vacuum through an orifice in the portion of said positioning guide which is removed from the surface of the conveyor.

2. Apparatus as recited in claim 1 further comprising, means for bumping non-rectified capsules into an area where they are affected by said vacuum rectification means.

3. Apparatus as recited in claim 1 wherein said capsule positioning guide means comprises a plate having a first portion of predetermined thickness, and a second portion of lesser thickness than said first portion, said first portion adapted to bear upon said capsule to retain said capsule in its respective pocket portion immediately prior to its being subjected to said vacuum rectification means, said second portion adapted to allow release of said capsule as it is subjected to said vacuum rectification means.

4. Apparatus as recited in claim 3 wherein a slot is provided in said second plate portion, said slot being in communication with said vacuum rectification means so that a vacuum is drawn upon said capsules through said slot.

5. Apparatus as recited in claim 1 wherein said pockets are provided in a plurality of adjacent rows on said transport conveyor and wherein a plurality of capsule positioning guide means are provided, each capsule positioning guide means being aligned with a row of pockets and being interposed between said row and said vacuum rectification means.

6. Apparatus as recited in claim 1 wherein said vacuum rectification means comprises a vacuum manifold.

* * * * *

UNITED STATES PATENT AND TRADEMARK OFFICE
CERTIFICATE OF CORRECTION

PATENT NO. : 4,327,825
DATED : May 4, 1982
INVENTOR(S) : Charles E. Ackley Sr., Charles E. Ackley, Jr.

It is certified that error appears in the above—identified patent and that said Letters Patent is hereby corrected as shown below:

Column 2, line 60: delete "4,104,466" and insert
--4,104,966--.

Signed and Sealed this

Thirteenth Day of July 1982

[SEAL]

Attest:

Attesting Officer

GERALD J. MOSSINGHOFF
Commissioner of Patents and Trademarks